United States Patent [19]
Zurcher et al.

[11] Patent Number: 5,770,950
[45] Date of Patent: Jun. 23, 1998

[54] MINIMIZING SIGNAL REFLECTION ALONG A TRANSMISSION LINE WITHOUT TERMINATING THE TRANSMISSION LINE

[75] Inventors: Daniel F. Zurcher; Ralph P. Trefney, both of Morgan Hill, Calif.

[73] Assignee: Cisco Systems, Inc., San Jose, Calif.

[21] Appl. No.: 535,899

[22] Filed: Sep. 28, 1995

[51] Int. Cl.$^6$ .............................................. H03K 19/0175
[52] U.S. Cl. ........................... 326/30; 375/254; 375/257; 375/296; 333/12; 333/17.3
[58] Field of Search .................................. 375/288, 254, 375/257, 258, 296; 326/30, 82, 86, 60, 83, 59; 333/124, 125, 127, 128, 12, 17.3

[56] References Cited

U.S. PATENT DOCUMENTS

| | | | |
|---|---|---|---|
| 4,408,307 | 10/1983 | Harris | 367/79 |
| 4,423,506 | 12/1983 | Kawasaki et al. | 370/85 |
| 4,616,898 | 10/1986 | Hicks, Jr. | 350/96.15 |
| 4,803,699 | 2/1989 | Graham . | |
| 4,825,113 | 4/1989 | Sato et al. | 370/2 |
| 4,833,668 | 5/1989 | Rowley et al. | 370/1 |
| 4,859,877 | 8/1989 | Cooperman et al. | 307/443 |
| 5,023,488 | 6/1991 | Gunning . | |
| 5,046,072 | 9/1991 | Shimizu et al. | 375/36 |
| 5,309,123 | 5/1994 | Gelin | 333/124 |
| 5,361,277 | 11/1994 | Grover . | |
| 5,369,516 | 11/1994 | Uchida | 359/125 |
| 5,517,487 | 5/1996 | Fridland et al. | 370/5 |
| 5,528,168 | 6/1996 | Kleveland | 326/30 |
| 5,548,734 | 8/1996 | Kolinski et al. | 395/306 |
| 5,596,285 | 1/1997 | Marbot | 326/30 |
| 5,604,450 | 2/1997 | Borkar et al. | 326/82 |

OTHER PUBLICATIONS

Mai Nguyen, "Reflection of Noise–Induced Degradation," Printed Circuit Design, pp. 19–20, 22, and 25–26 (Jul. 1995).

*Primary Examiner*—Wellington Chin
*Assistant Examiner*—Jean B. Corrielus
*Attorney, Agent, or Firm*—Blakely, Sokoloff, Taylor & Zafman

[57] ABSTRACT

In a data transmission system having a first and a second data transmission device and a transmission line that is not terminated, a method of minimizing signal reflection along the transmission line is described that includes the step of connecting the first and second data transmission devices to the transmission line such that the distance between the first and second data transmission devices is substantially proportional to a wavelength of a predetermined frequency. Data to be transmitted from the first data transmission device to the second data transmission device via the transmission line are encoded in the first data transmission device such that energy of the encoded data is substantially concentrated around the predetermined frequency to minimize the signal reflection without terminating the transmission line. A data transmission system with minimized signal reflection is also described.

20 Claims, 8 Drawing Sheets

MINIMIZING SIGNAL REFLECTION ALONG A TRANSMISSION LINE WITHOUT TERMINATING THE TRANSMISSION LINE

FIELD OF THE INVENTION

The present invention pertains to the field of data transmission. More particularly, this invention relates to an arrangement of minimizing signal reflection along a transmission line of a data transmission system without terminating the transmission line.

BACKGROUND OF THE INVENTION

A computer system or a data transmission system typically includes a number of devices or modules that communicate with each other using a bus. The bus is essentially comprised of a transmission line or a number of transmission lines that may carry signals such as clock, control, data, and address signals among the devices.

The timing and distribution of signals along the bus is often of critical importance in the computer or data transmission system. However, as with other types of transmission lines, signal reflection along a transmission line of the bus may frustrate signal timing and distribution. Signal reflections are created when the bus interfaces with a component that has an impedance which differs from the characteristic impedance of the bus. In other words, impedance discontinuities on the bus will generate reflections.

In particular, signal reflections can have a detrimental effect on the speed and operation of the system. The devices communicating on the bus might have to wait until the reflections have subsided before accepting any signal from the bus as valid. This waiting period tends to slow the system down. Alternatively, if a sufficient waiting period has not elapsed, then signal reflections might be misinterpreted as valid signals resulting in unpredictable operation of the system.

One prior art method of decreasing the effect of signal reflections requires the use of terminators. A terminator is a dissipative load, typically a resistor, located at the end of a transmission line. The terminator is chosen to have an impedance that matches the characteristic impedance of the transmission line. Prior art termination architectures includes series termination and parallel termination.

In series termination, the terminating resistor is placed in series with the device driving the transmission line. In parallel termination, the device drives the transmission line directly and a terminator is placed at one or both ends of the transmission line. A bus with a parallel termination at one end of the bus is referred to as a single parallel termination bus. Alternatively such a bus may be called a singly terminated bus. A bus with parallel terminations at both ends is referred to as a double parallel termination bus. Alternatively such a bus may be called a doubly terminated bus.

FIG. 1 shows a prior art a data transmission system 10 with a doubly terminated bus 11. As can be seen from FIG. 1, resistors 13a through 13n are termination resistors at one end of bus 11 and resistors 14a through 14n are termination resistors at the other end of bus 11 such that bus 11 is terminated at both ends of the transmission lines of bus 11. Each of termination resistors 13a–13n and 14a–14n has an impedance which corresponds to the impedance of its corresponding transmission line of bus 11. In this way, when a signal is carried along a transmission line of bus 11 to its termination resistor, the resistor absorbs the signal energy, thus eliminating signal reflections which may occur on the bus and cause erroneous signals. FIG. 2 shows the energy distribution of a typical data transmission along the transmission line of bus 11.

Disadvantages are, however, still associated with such prior art bus system. One disadvantage associated is that the termination resistors typically consume energy of the signal. This typically requires the device that sends the data signal to the transmission line to increase the power of the data signal so that the data signal can propagate through the transmission line. This in turn causes the transmission system to dissipate more power to transmit the data signal.

Another disadvantage associated with terminating the transmission line using termination resistors is that the termination resistors typically occupy some space on the printed circuit board on which the bus is configured. This typically increases the size of the printed circuit board which in turn increases the size of the entire system.

SUMMARY OF THE INVENTION

One of the features of the present invention is to minimize signal reflection along a transmission line of a data transmission system without terminating the transmission line.

Another feature of this present invention is to reduce power loss along a transmission line by eliminating the terminating resistors connected to the transmission line.

Another feature of the present invention is to encode data to be transmitted along a transmission line to allow energy of the encoded data to be substantially concentrated around a predetermined frequency such that data transmission devices can be spaced apart along the transmission line at non-zero integer times of one half of a wavelength distance, wherein the wavelength is determined based on the predetermined frequency.

In a data transmission system having a first and a second data transmission device and a transmission line that is not terminated, a method of minimizing signal reflection along the transmission line is described that includes the step of connecting the first and second data transmission devices to the transmission line such that the distance between the first and second data transmission devices is substantially proportional to a wavelength of a predetermined frequency. Data to be transmitted from the first data transmission device to the second data transmission device via the transmission line are encoded in the first data transmission device such that energy of the encoded data is substantially concentrated around the predetermined frequency to minimize the signal reflection without terminating the transmission line.

A data transmission system is also described. The data transmission system includes a transmission line that is not terminated at its ends. A first data transmission device is coupled to the transmission line at a first point. A second data transmission device is coupled to the transmission line at a second point. The distance between the first and second points is substantially proportional to a wavelength of a predetermined frequency. Each of the distance between the first point and the first device and the distance between the second point and the second device is also substantially proportional to the wavelength of the predetermined frequency. A data encoding circuit is provided in a first data transmission device. The data encoding circuit encodes data to be transmitted from the first device to the second device such that energy of the encoded data is substantially concentrated around the predetermined frequency to minimize the signal reflection without terminating the transmission line.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 3:
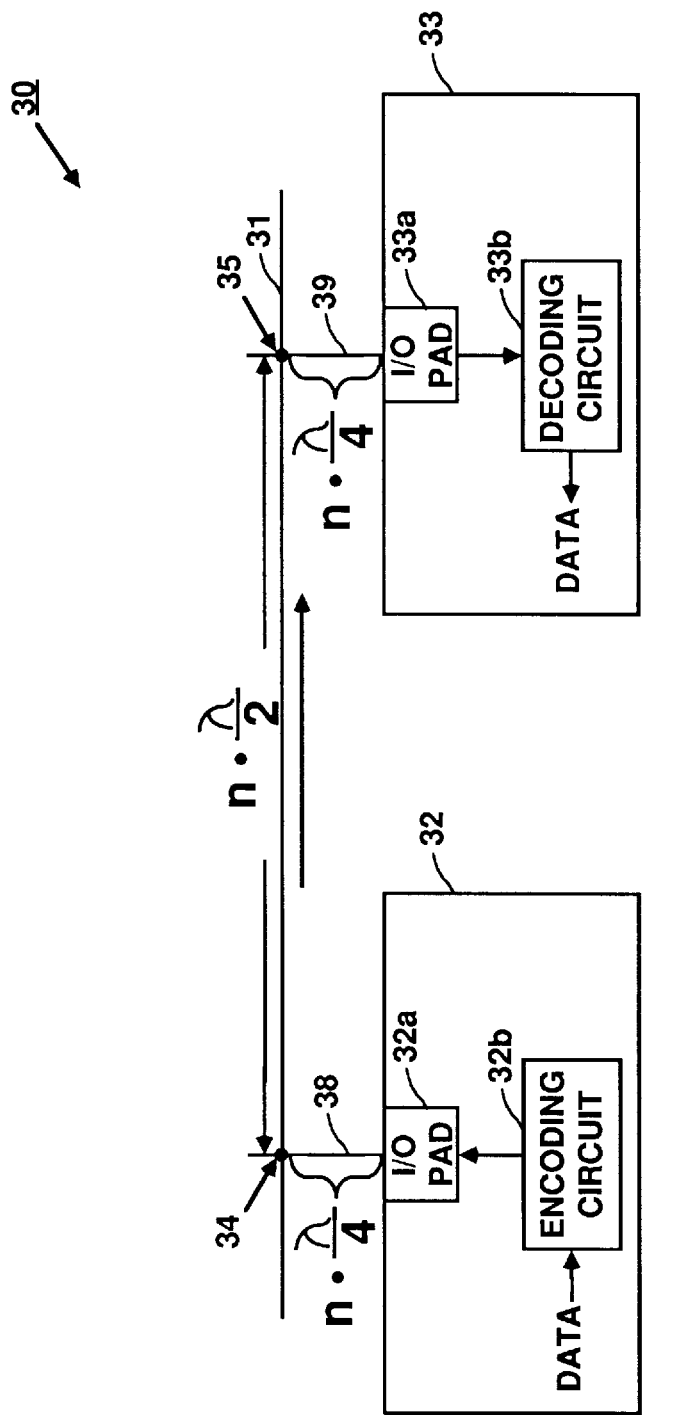
FIG. 3 shows a data transmission system that implements one embodiment of the present invention, wherein data transmitted along the transmission line of the system are encoded and the line length of the transmission line between taps of the two devices is predetermined and the tap distance from each of the taps to the respective one of the two devices of the system is also predetermined.

FIG. 3 shows a data transmission system 30 that implements one embodiment of the present invention. As can be seen from FIG. 3, data transmission system 30 includes a transmission line 31 that is connected to a pair of data transmission devices 32 and 33 at points or nodes 34 and 35, respectively.

Data transmission system 30 can be a computer system, a data processing system, or a network communication system. For one embodiment, system 30 is a computer system. For another embodiment, data transmission system 30 is a network switching system. Furthermore, data transmission system 30 can be other type of data processing system.

Transmission line 31 represents the bus of data transmission system 30. FIG. 3 only shows one transmission line for the bus. In practice, the bus includes many more lines, including transmission line 31.

Similarly, FIG. 3 only shows data transmission devices 32 and 33 within data transmission system 30. In practice, data transmission system 30 may include many more data transmission devices. Each of data transmission devices 32 and 33 can transmit and receive data from the other device via transmission line 31. When one of devices 32 and 33 is transmitting data to the other device, the transmitting device is referred to as the bus master and the receiving device is referred to as the bus slave. FIG. 3 only shows that device 32 functions as the bus master and device 33 functions as the bus slave.

Each of devices 32 and 33 is a semiconductor integrated circuit device or module. Each of devices 32 and 33 performs a predetermined function. For example, each of devices 32 and 33 can be a processor, a memory (e.g., DRAM, SRAM, or electrically erasable and programmable nonvolatile memory), a microcontroller, or an application specific integrated circuit ("ASIC").

As can be seen from FIG. 3, device 32 has an I/O pad 32a that is connected to point 34 of transmission line 31 and device 33 has an I/O pad 33a connected to point 35 of transmission line 31. The distance of transmission line 31 between points 34 and 35 is equal to n•λ/2, wherein n is a non-zero integer and λ represents the wavelength of a periodic signal. In addition, the tap distance for each of lines 38 and 39 is equal to n•λ/4. As can be seen from FIG. 3, line 38 is connected between node 34 and I/O pad 32a and line 39 is connected between node 35 and I/O pad 33a. As is known, the tap distance is the line distance between node 34 to I/O pad 32a or between node 35 to I/O pad 33a. The determination of the wavelength λ is conducted in accordance with one embodiment of the present invention which will be described in more detail below, in conjunction with FIGS. 4–8.

Referring again to FIG. 3, transmission line 31 is not terminated. Alternatively, transmission line 31 can be singly terminated or doubly terminated.

Device 32 includes an encoding circuit 32b and device 33 includes a decoding circuit 33b, as can be seen from FIG. 3. Encoding circuit 32b receives the data to be transmitted to device 33 via transmission line 31 from other circuits (not shown) within data transmission device 32. Encoding circuit 32b receives the data at a predetermined data rate $f_D$. Encoding circuit 32b then encodes the data and transmits the encoded data to device 33 via transmission line 31 at the data rate $f_D$. Encoding circuit 32b encodes the data using a memory encoding scheme in accordance with one embodiment of the present invention. The memory encoding scheme allow energy of the encoded data to be substantially concentrated at a frequency $f_0$ that is approximately equal to 0.4 $f_D$ (see FIG. 8). This in turn allows spectral energy control of the dispersion frequencies related to the data. The memory encoding scheme will be described in more detail below, in conjunction with FIGS. 4–8.

Referring again to FIG. 3, device 33 receives the encoded data from transmission line 31. Decoding circuit 33b of device 33 decodes the encoded data and then sends the decoded data to circuits (not shown) within device 33 where the decoded data are intended. The decoding process of decoding circuit 33b is the reverse process of the encoding process of encoding circuit 32b and can be easily understood by any person skilled in the art after having learned the memory encoding scheme. Hence, decoding circuit 33b and its function will not be described in more detail below.

Figure 8:
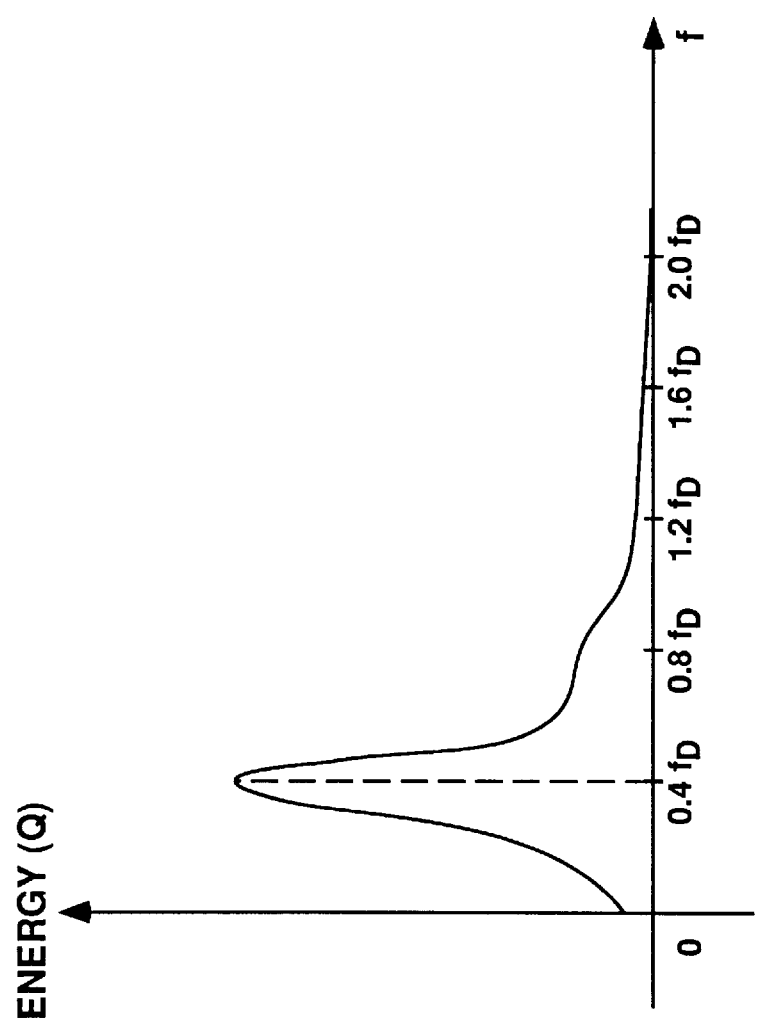
FIG. 8 shows the energy distribution of the data encoded by the memory encoding scheme shown in FIGS. 5–6D.

As will be described in more detail below, because the data transmitted along transmission line 31 are encoded in accordance with the memory encoding scheme shown in FIGS. 5–6D of one embodiment of the present invention, the energy of the encoded data is concentrated at the frequency $f_0$ (see FIG. 8). This, therefore, allows devices 32 and 33 to be spaced apart along transmission line 31 at non-zero integer times (i.e., 1, 2, 3, . . .) of one half wavelength of the frequency $f_0$. In addition, the tap distance of each of lines 38 and 39 is made to be non-zero integer times of one fourth wavelength of the frequency $f_0$. This effectively eliminates signal reflection along transmission line 31 without the need to terminate transmission line 31.

Figure 1:
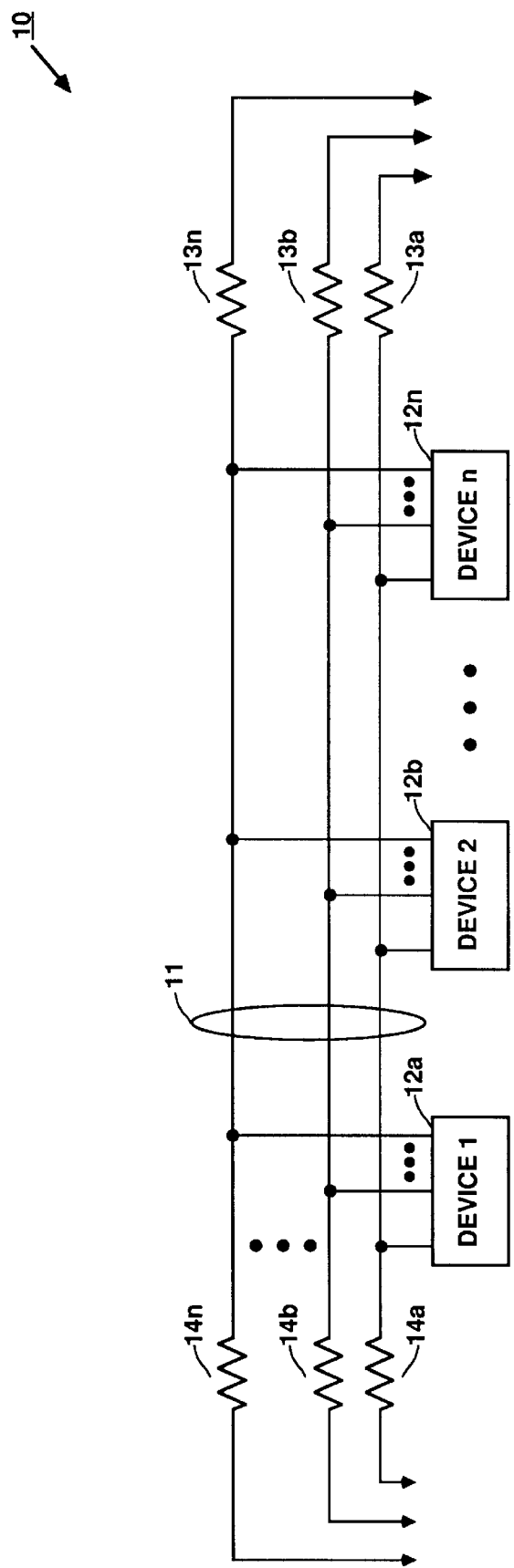
FIG. 1 shows a prior art doubly terminated bus system.
Figure 2:
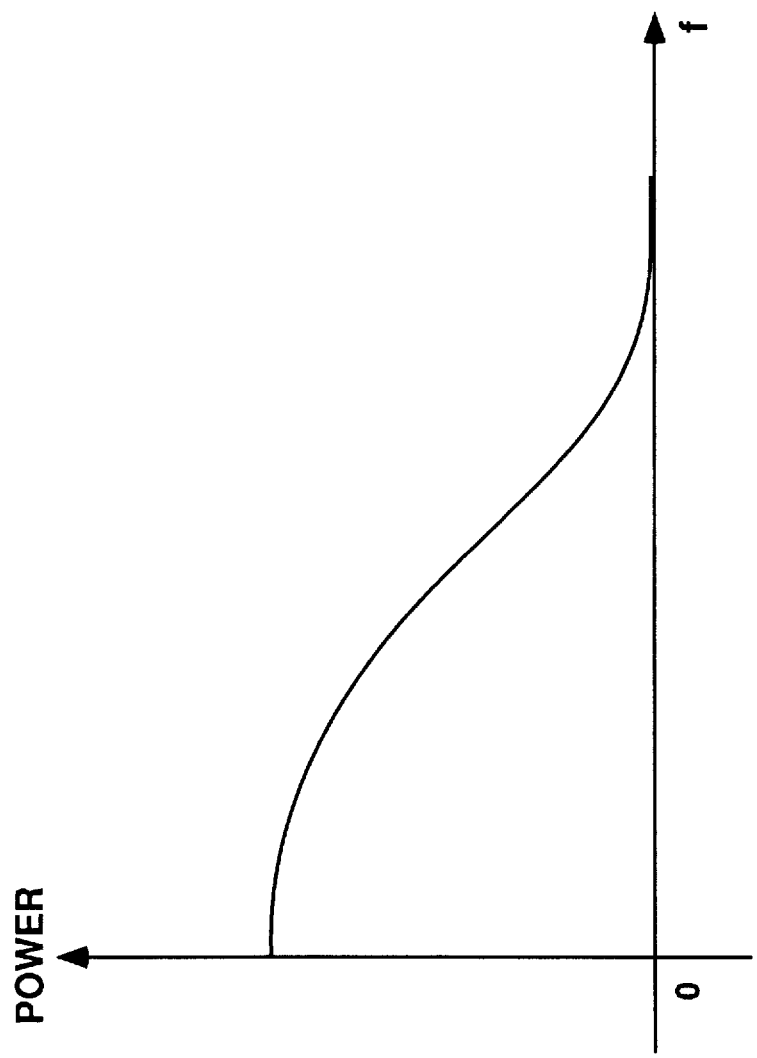
FIG. 2 shows the energy distribution of data transmitted along the transmission line of the bus of FIG. 1.

As can be seen from FIG. 2, an unencoded data stream with equal binary values (i.e., 50–50 chances of a logical one or zero) typically does not have its energy concentrated at any frequency. This is due to the fact that a data stream typically has random appearance of the logical high value (i.e., logical one) and logical low value (i.e., logical zero). However, when the data are encoded in accordance with the memory encoding scheme of the present invention, the signal energy is concentrated around the frequency $f_0$, wherein $f_0$ equals approximately 0.4 $f_D$.

Because the signal energy of the encoded data along transmission line 31 is substantially concentrated around the frequency $f_0$ (see FIG. 8), signal reflections are avoided along transmission line 31 when devices 32 and 33 are spaced apart along transmission line 31 at non-zero integer times (i.e., 1, 2, 3, . . .) of one half of the wavelength λ of the $f_0$ frequency and the tap distance for each of lines 38 and 39 is set at non-zero integer times of one fourth wavelength of the $f_0$ frequency. This effectively eliminates the signal reflections along transmission line 31 without requiring termination of transmission line 31. In addition, this causes the impedance of each of devices 32 and 33 to match to the characteristic impedance of transmission line 31, thus making each of devices 32 and 33 transparent to the remainder of system 30. The memory encoding scheme and the determination of the $f_0$ frequency will be described in more detail below.

For one embodiment, the distance between points 34 and 35 equals one half of the wavelength λ of the $f_0$ frequency. For another embodiment, the distance between points 34 and 35 equals the entire wavelength λ of the frequency $f_0$. Alternatively, the distance between points 34 and 35 can be two or three times of one half of the wavelength λ of the $f_0$ frequency.

Similarly, for one embodiment, the tap distance from point 34 to I/O pad 32a for line 38 is equal to one fourth of the wavelength λ of the $f_0$ frequency and the tap distance from point 35 to I/O pad 33a for line 39 is equal to one fourth of the wavelength λ of the $f_0$ frequency. For another embodiment, the tap distance for each of lines 38 and 39 is equal to one half of the wavelength λ of the $f_0$ frequency. Alternatively, the tap distance for each of lines 38 and 39 equals n·λ/4, wherein n=1, 2, 3, . . .

FIG. 3 only shows device 32 with encoding circuit 32b and device 33 with decoding circuit 33b. In practice, each of devices 32 and 33 may include an encoding circuit like encoding circuit 32b and a decoding circuit like decoding circuit 33b coupled to its respective one of I/O pads 32a and 33a. In this case, when device 32 is sending data, its encoding circuit is activated. When device 32 is receiving data, its decoding circuit is activated.

Figure 4:
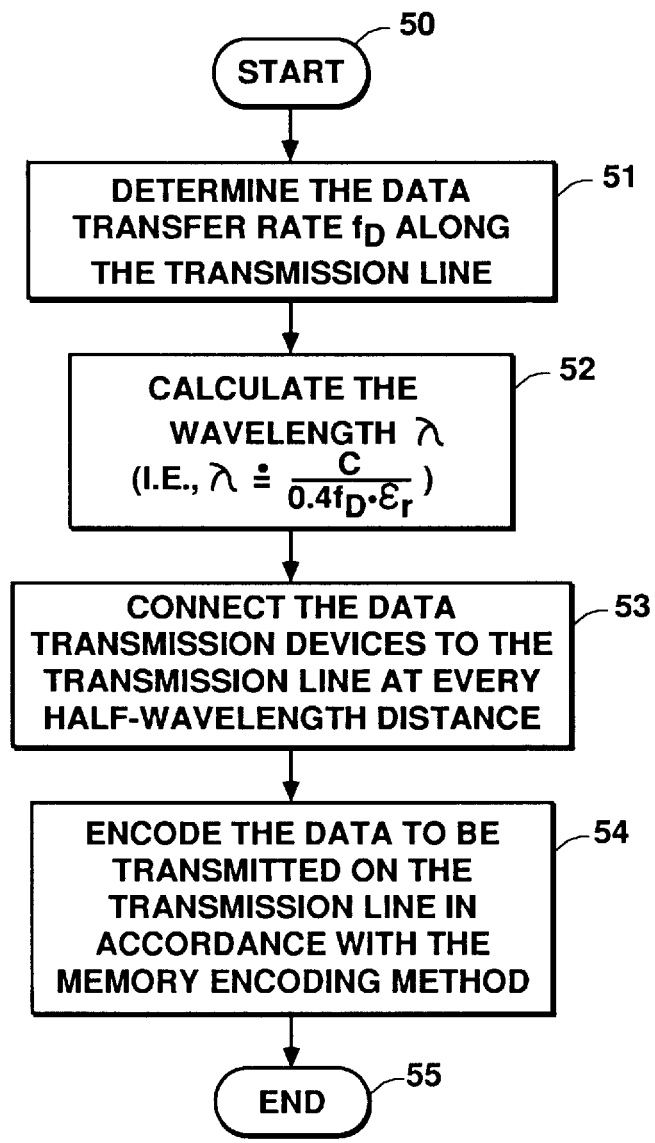
FIG. 4 is the flow chart diagram showing the process of spacing the data transmission devices along the transmission line of FIG. 3 at the predetermined distance and encoding the data in accordance with one embodiment of the present invention.

FIG. 4 shows the process of accomplishing termination-less and reflection-less data transmission system 30 of FIG. 3. As can be seen from FIG. 4, the process starts at step 50, at step 51, the data transfer rate $f_D$ along transmission line 31 is determined. Then the wavelength λ is calculated based on the data rate $f_D$ at step 52. For one embodiment, the wavelength λ is approximately equal to $$\frac{C}{0.4 \cdot f_D \cdot \sqrt{\epsilon_r}},$$

wherein C is the propagation speed of an electrical signal (i.e., C equals 2.998×10⁸ miles/sec.) and $\epsilon_r$ is the dielectrical constant which depends on transmission media. For another embodiment, the wavelength λ is approximately equal to $$\frac{C}{\beta \cdot f_D \cdot \sqrt{\epsilon_r}},$$

wherein β is selected from a range of 0.4 to 0.5 and $\epsilon_r$ is the dielectrical constant which depends on transmission media.

At step 53, devices 32 and 33 are connected to transmission line 31 at one half of the wavelength λ. Alternatively, devices 32 and 33 can be spaced at other non-zero integer times of one half of the wavelength, as described above. Then the process moves to step 54 at which data transmitted from device 32 are encoded in encoding circuit 32b using the memory encoding scheme of the present invention to concentrate signal energy of the data to be transmitted along transmission line 31 substantially around the $f_0$ frequency. By doing this, signal reflections along termination-less transmission line 31 can be canceled. The process then ends at step 55.

Figure 5:
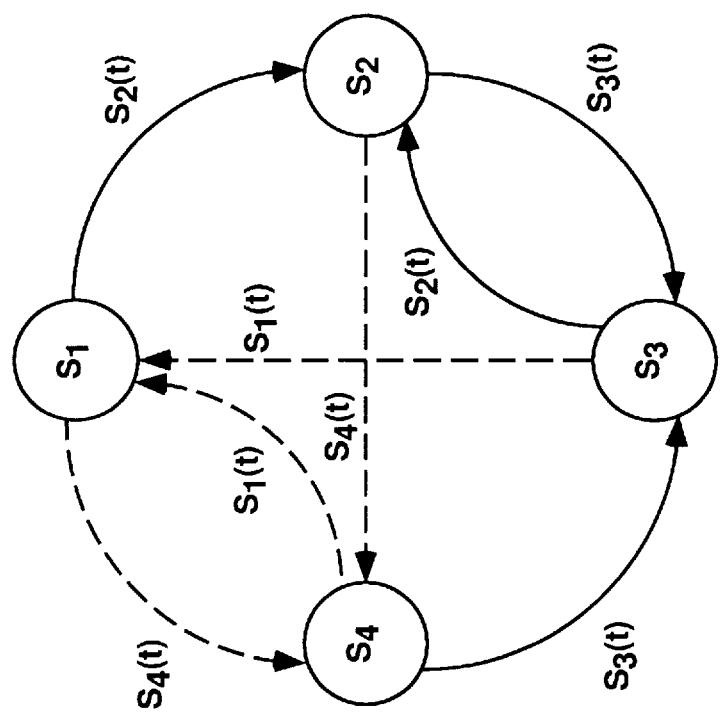
FIG. 5 shows a memory encoding scheme for encoding the data to be transmitted along the transmission line of FIG. 3 in accordance with one embodiment of the present invention.
Figure 6A:
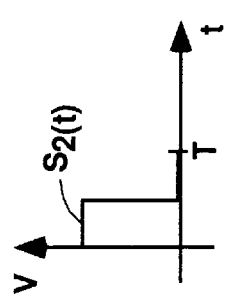
FIGS. 6A through 6D show four different waveforms employed by the memory encoding scheme of FIG. 5.
Figure 6B:
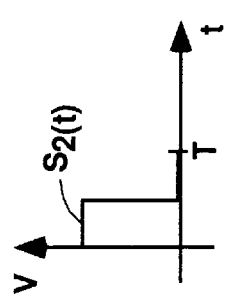
Figure 6C:
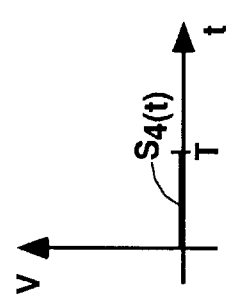
Figure 6D:
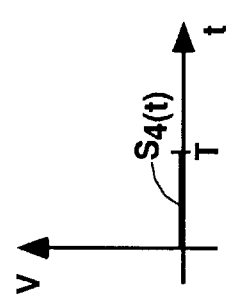
Figure 7:
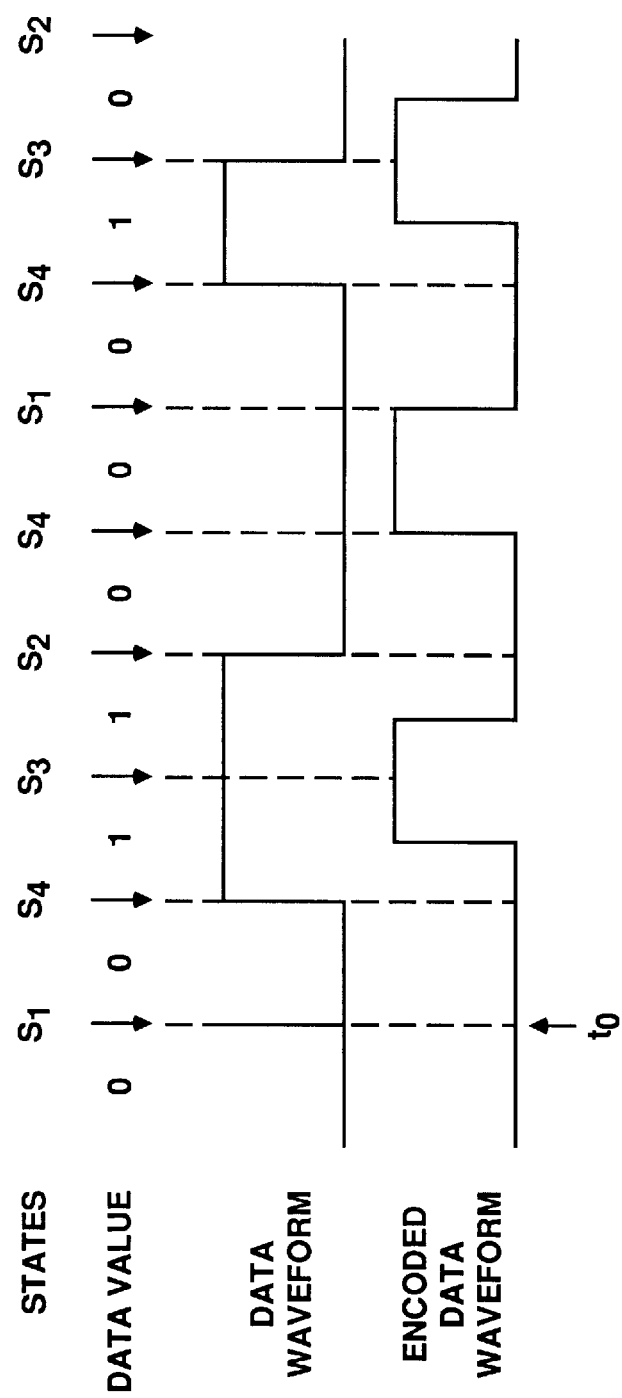
FIG. 7 shows the signal waveform of an encoded data stream.

Referring to FIGS. 5, 6A–6D, and 7, the memory encoding scheme employed by encoding circuit 32b (FIG. 3) is described. FIG. 5 shows the state diagram of the memory encoding scheme, wherein each transition between states is represented by a solid line if a logical one is to be encoded and a dashed line if a logical zero is to be encoded. FIGS. 6A through 6D show the waveforms of encoding signals $S_1(t)$ through $S_4(t)$. FIG. 7 shows an example of data encoded using the memory encoding scheme of FIGS. 5 through 6D.

Referring to FIGS. 5, 6A–6D, and 7, the memory encoding scheme is further described in connection with an example shown in FIG. 7. As shown in FIG. 7, the encoding starts at timing $t_0$. At this time, the value of its previous bit equals "0" and the value of the data bit is "0". This causes the data bit to be encoded by the $S_4(t)$ as the encoding moves from the state "$S_1$" to the state "$S_4$" (see FIGS. 5 and 6A). Then a "1" data bit is received which is encoded by the $S_3(t)$ signal as the encoding moves from the "$S_4$" state to the "$S_3$" state (see FIGS. 5 and 6C). Then another "1" data bit is received which is encoded by the $S_2(t)$ signal as the encoding moves from the "$S_3$" state to the "$S_2$" state (see FIGS. 5 and 6B). Then a "0" data bit is received which is encoded by the $S_4(t)$ signal as the encoding moves from the "$S_2$" state to the "$S_4$" state (see FIGS. 5 and 6D). Another "0" data bit is then received which is encoded by the $S_1(t)$ signal as the encoding moves from the "$S_4$" state to the "$S_1$" state (see FIGS. 5 and 6D). The process then moves on to further encode the data stream as can be seen from FIG. 7.

As described above, the memory encoding scheme described above in accordance with FIGS. 5–7 allows the energy of the encoded data to be concentrated around a predetermined frequency (i.e., the frequency $f_0$). FIG. 8 shows the power spectra for the encoded data in accordance with the above-described memory encoding scheme. The equation for generating the signal energy distribution waveform of FIG. 8 is as follows.

$$Q_i = \sum_{i=0}^{1000} \left[ \frac{\sin\left(\frac{i}{1000} \cdot \pi \cdot f_D \cdot \frac{T}{2}\right)}{\pi \cdot f_D \cdot \left(\frac{i}{1000} \cdot \left(\frac{T}{2}\right)\right)} \right]^2.$$

$$\frac{3 + \cos\left[\pi \cdot \left(\frac{i}{1000}\right) \cdot T \cdot f_D\right] + 2 \cdot \cos\left[2 \cdot \pi \cdot \left(\frac{i}{1000}\right) \cdot T \cdot f_D\right] - \cos\left[3 \cdot \pi \cdot \left(\frac{i}{1000}\right) \cdot T \cdot f_D\right]}{\left[9 + 12 \cdot \cos\left[2 \cdot \pi \cdot \left(\frac{i}{1000}\right) \cdot T \cdot f_D\right] + 4 \cdot \cos\left[4 \cdot \pi\left(\frac{i}{1000}\right) \cdot T \cdot f_D\right]\right]}$$

wherein Q represents energy, $f_D$ represents frequency and T represents period (i.e., $1/f_D$). As can be seen from FIG. 8, the signal energy of the encoded data is concentrated within a bandwidth less than 10% of the $f_D$ data rate. In addition, the energy is concentrated around approximately the $f_0$ frequency which is 0.4 to 0.5 times of the data rate $f_D$. From system design standpoint, it can be concluded that the energy of the encoded data is concentrated around 0.4 times of the data rate $f_D$ of the encoded data.

Once the frequency $f_0$ at which energy of encoded data is concentrated is determined, the wavelength $\lambda$ of the $f_0$ frequency is also determined. This in turn allows devices 32 and 33 (FIG. 3) to be able to be spaced along transmission line 31 (FIG. 3) at one half of the wavelength $\lambda$ of the $f_0$ frequency that effectively cancels any signal reflection along transmission line 31.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of minimizing signal reflection along a transmission line, comprising the steps of:
   (A) connecting a first and a second data transmission device to the transmission line such that a distance between the first and second data transmission devices is substantially proportional to a wavelength of a predetermined frequency;
   (B) encoding data to be transmitted from the first data transmission device to the second data transmission device via the transmission line such that energy of the encoded data is substantially concentrated around the predetermined frequency to minimize the signal reflection without terminating the transmission line.

2. The method of claim 1, wherein the step (B) is a spectral energy control encoding step which causes spectral energy of the encoded data to be concentrated substantially around the predetermined frequency.

3. The method of claim 2, wherein the predetermined frequency is proportional to a data rate of the data.

4. The method of claim 1, wherein the step (B) is a memory encoding step in which a data bit of the data is encoded by taking into consideration of an adjacent data bit of the data.

5. The method of claim 4, wherein the step (B) further comprises the steps of
   (I) receiving a first data bit of the data;
   (II) determining the state of the first data bit and the state of a second data bit of the data which has been received prior to the first data bit and is adjacent to the first data bit;
   (III) encoding the first data bit based on the determined state of the first and second data bits.

6. The method of claim 1, further comprising the step of decoding the encoded data in the second data transmission device.

7. The method of claim 1, wherein the step (A) further comprises the step of allowing the distance of the transmission line between the first and second data transmission devices to be substantially equal to non-zero integer times of one half of the wavelength determined by the predetermined frequency.

8. The method of claim 1, wherein the step (A) further comprises the step of allowing the distance of a first line linking the first data transmission device to the transmission line to be substantially equal to non-zero integer times of one fourth of the wavelength determined by the predetermined frequency and the distance of a second line linking the second data transmission device to the transmission line to be substantially equal to non-zero integer times of one fourth of the wavelength determined by the predetermined frequency.

9. The method of claim 1, wherein the transmission line is not terminated at its ends.

10. In a data transmission system having a first and a second data transmission device and an unterminated transmission line, a method of minimizing signal reflection along the transmission line, comprising the steps of:
    (A) connecting the first and second devices to the transmission line such that a distance of the transmission line between the first and second devices is substantially proportional to a wavelength of a predetermined frequency;
    (B) spectral energy control encoding data to be transmitted from the first device to the second device such that energy of the encoded data is substantially concentrated around the predetermined frequency to minimize the signal reflection without terminating the transmission line.

11. The method of claim 10, wherein the step (B) is a memory encoding step that further comprises the steps of
    (I) receiving a first data bit of the data;
    (II) determining the state of the first data bit and the state of a second data bit of the data which has been received prior to the first data bit and is adjacent to the first data bit;
    (III) encoding the first data bit based on the determined state of the first and second data bits.

12. The method of claim 11, wherein the predetermined frequency is proportional to a data rate of the data.

13. The method of claim 12, wherein the step (A) further comprises the step of allowing the distance of the transmission line between the first and second data transmission devices to be substantially equal to non-zero integer times of one half of the wavelength determined by the predetermined frequency.

14. The method of claim 13, wherein the step (A) further comprises the step of allowing the distance between the first and second data transmission devices to be substantially equal to one half of the wavelength determined by the predetermined frequency.

15. A data transmission system, comprising:
    (A) a transmission line that is not terminated at its ends;
    (B) a first data transmission device coupled to the transmission line at a first point;

(C) a second data transmission device coupled to the transmission line at a second point, wherein a distance between the first and second points is substantially proportional to a wavelength of a predetermined frequency;

(D) a data encoding circuit in a first data transmission device, the data encoding circuit encoding data to be transmitted from the first device to the second device such that energy of the encoded data is substantially concentrated around the predetermined frequency to minimize the signal reflection without terminating the transmission line.

16. The data transmission system of claim 15, further comprising a decoding circuit in the second data transmission device that decodes the encoded data in the second data transmission device.

17. The data transmission system of claim 15, wherein the data encoding circuit is a spectral energy control encoding circuit which causes spectral energy of the encoded data to be concentrated substantially around the predetermined frequency.

18. The data transmission system of claim 15, wherein the predetermined frequency is proportional to a data rate of the data.

19. The data transmission system of claim 18, wherein the distance of the transmission line between the first and second data transmission devices is substantially equal to non-zero integer times of one half of the wavelength determined by the predetermined frequency.

20. The data transmission system of claim 18, wherein the step (A) further comprises the step of allowing the distance between the first and second data transmission devices to be substantially equal to one half of the wavelength determined by the predetermined frequency.

* * * * *